United States Patent
Singh

(10) Patent No.: US 8,648,559 B2
(45) Date of Patent: Feb. 11, 2014

(54) SYSTEM FOR CONTROLLING ROTARY ELECTRIC MACHINES TO REDUCE CURRENT RIPPLE ON A DIRECT CURRENT BUS

(75) Inventor: Brij N. Singh, West Fargo, ND (US)

(73) Assignee: Deere & Company, Moline, IL (US)

( * ) Notice: Subject to any disclaimer, the term of this patent is extended or adjusted under 35 U.S.C. 154(b) by 270 days.

(21) Appl. No.: 13/194,237

(22) Filed: Jul. 29, 2011

(65) Prior Publication Data

US 2012/0235617 A1    Sep. 20, 2012

Related U.S. Application Data

(60) Provisional application No. 61/453,169, filed on Mar. 16, 2011.

(51) Int. Cl.
*H02P 6/00*        (2006.01)

(52) U.S. Cl.
USPC ....... 318/400.42; 318/41; 318/87; 318/400.2; 318/801; 318/811

(58) Field of Classification Search
USPC .............. 318/400.2, 400.42, 41, 87, 801, 811
See application file for complete search history.

(56) References Cited

U.S. PATENT DOCUMENTS

| | | | | |
|---|---|---|---|---|
| 4,263,535 A * | 4/1981 | Jones | ............................... | 318/87 |
| 4,292,531 A * | 9/1981 | Williamson | .................... | 290/14 |
| 5,142,435 A | 8/1992 | Baumgartner et al. | | |
| 5,369,540 A | 11/1994 | Konrad et al. | | |
| 5,914,582 A | 6/1999 | Takamoto et al. | | |
| 6,630,804 B2 * | 10/2003 | Moriya et al. | .................. | 318/85 |
| 6,864,646 B2 * | 3/2005 | Rahman et al. | .................. | 318/41 |
| 7,227,273 B2 * | 6/2007 | Ahmad et al. | ............... | 290/40 C |
| 7,330,012 B2 * | 2/2008 | Ahmad et al. | ................ | 318/811 |
| 7,385,372 B2 * | 6/2008 | Ahmad et al. | ................ | 318/811 |
| 7,511,438 B2 * | 3/2009 | Melfi | ............................... | 318/87 |
| 7,609,024 B2 * | 10/2009 | Ahmad et al. | ................ | 318/811 |
| 7,956,569 B2 * | 6/2011 | Welchko et al. | ............. | 318/801 |
| 8,026,691 B2 * | 9/2011 | Nagashima et al. | ........... | 318/801 |
| 8,179,066 B2 * | 5/2012 | Terorde | ...................... | 318/400.2 |
| 2004/0160201 A1 * | 8/2004 | Rahman et al. | .................. | 318/41 |
| 2006/0164027 A1 * | 7/2006 | Welchko et al. | .............. | 318/105 |

(Continued)

OTHER PUBLICATIONS

Baumann, M. minimization of the DC Current Ripple of a Three-Phase Buck+Boost PWM Unity Power Factor Rectifier. Retrieved from the internet<URL: http://ieeexplore.ieee.org/stamp/stamp.jsp?arnumber=997564>.

(Continued)

*Primary Examiner* — Paul Ip

(57) ABSTRACT

The system comprises a first motor for applying rotational energy to a respective first wheel of the vehicle. A second motor is arranged for applying rotational energy to a respective second wheel of the vehicle. A first inverter is coupled to the first motor, where the first inverter is capable of receiving direct current electrical energy from the direct current bus. The first inverter is configured to provide a first group of alternating currents with a corresponding reference phase. A second inverter is coupled to the second motor. The second inverter is capable of receiving direct current electrical energy from the direct current bus. The second inverter is configured to provide a second group of alternating currents with a phase shift with respect to the reference phase, such that the phase shift is effective to reduce the direct current ripple on the direct current bus.

22 Claims, 3 Drawing Sheets

(56) References Cited

U.S. PATENT DOCUMENTS

| | | |
|---|---|---|
| 2006/0247829 A1 | 11/2006 | Sato |
| 2008/0079373 A1* | 4/2008 | Melfi .............................. 318/63 |
| 2009/0034308 A1* | 2/2009 | Welchko et al. ............. 363/133 |
| 2009/0112384 A1 | 4/2009 | Jeon et al. |
| 2010/0109582 A1* | 5/2010 | Terode ....................... 318/400.2 |
| 2012/0235617 A1* | 9/2012 | Singh ....................... 318/400.42 |
| 2013/0043819 A1* | 2/2013 | De ................................ 318/503 |

OTHER PUBLICATIONS

Drew, J. Capacitor Ripple Current improvements. Power Electronics Technology. Aug. 2004, Retrieved from the internet<URL: http://powerelectronics.com/mag/408pet22a_web.pdf>.

* cited by examiner

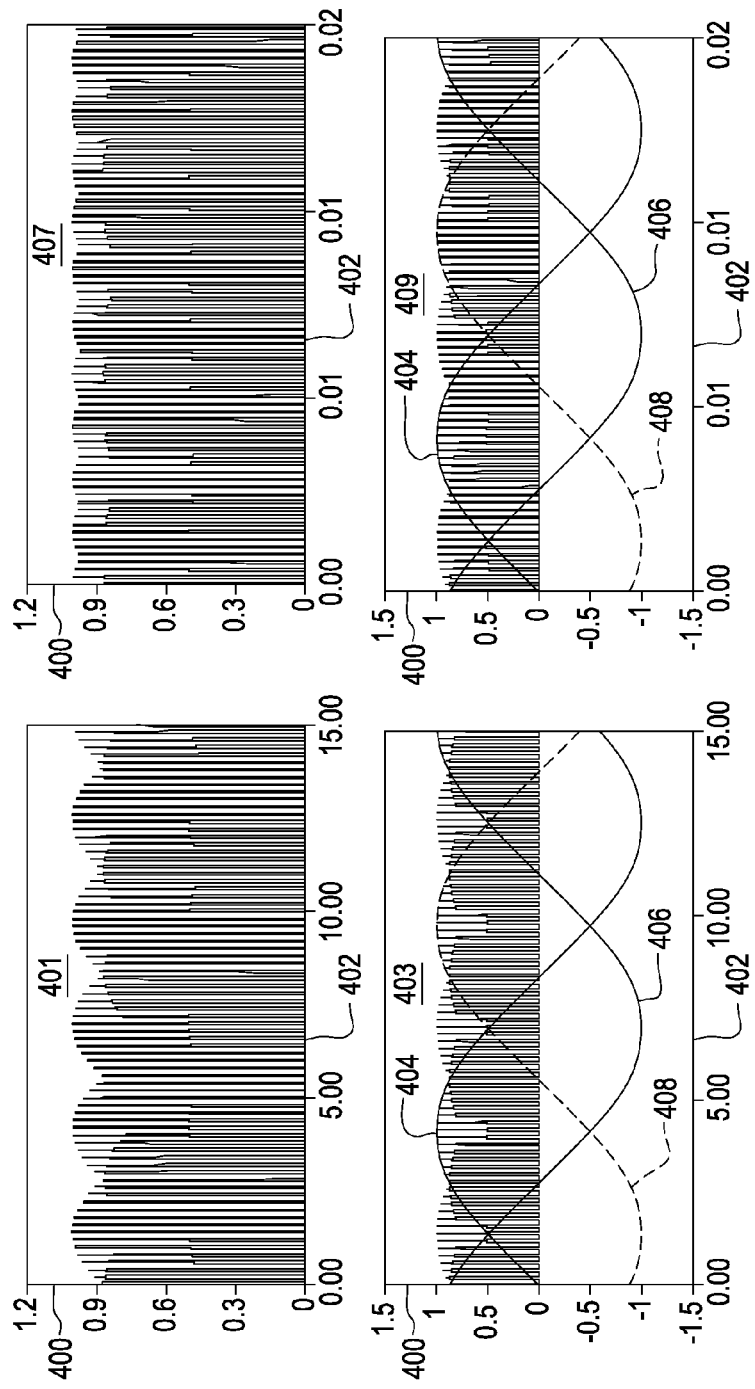

SYSTEM FOR CONTROLLING ROTARY ELECTRIC MACHINES TO REDUCE CURRENT RIPPLE ON A DIRECT CURRENT BUS

This document claims priority based on U.S. provisional application Ser. No. 61/453,169, filed on 16 Mar. 2011 and entitled SYSTEM FOR CONTROLLING ROTARY ELECTRIC MACHINES TO REDUCE CURRENT RIPPLE ON A DIRECT CURRENT BUS, under 35 U.S.C. 119(e).

FIELD OF THE INVENTION

This invention relates to system for controlling rotary electric machines to reduce current ripple on a direct current bus.

BACKGROUND

In the prior art, a vehicle may be configured with multiple rotary electric machines that are controlled by a group of respective inverters. The rotary electric machines may comprise one or more alternating current drive motors, one or more generators, or both. Each of the inverters may draw direct current from a direct current data bus and convert it into alternating current signals with corresponding phases for each rotary electric machine. As each inverter demands direct current to generate alternating current of one or more phases, the direct current on the direct current bus may experience fluctuations or current ripple that coincides with, or is related to, the phases of the generated alternating current. For example, in certain instances the current ripple on the direct current bus might be characterized as a transiently lower-than-expected direct current on the direct current bus or undesired fluctuations in the direct current over time on the direct current bus that potentially makes the control of the rotary machines (e.g., electric motor rotational speed or commanded torque) prone to error. To address the problem of elevated current ripple on the direct current bus, certain prior art vehicles use greater (or proportionally elevated) capacitive filtering on the direct current bus in the form of larger capacitor banks, for example. However, greater capacitive filtering may increase the cost and weight of the vehicle, which can lead to reduced fuel economy. Thus, there is need to reduce the current ripple on the direct current bus or to reduce the required size and associated cost of larger capacitor banks.

SUMMARY OF THE INVENTION

In accordance with one embodiment, a system is capable of controlling the propulsion of a vehicle with reduced ripple current on the direct current bus. The system comprises a first motor for applying rotational energy to a respective first wheel of the vehicle. A second motor is arranged for applying rotational energy to a respective second wheel of the vehicle. A first inverter is coupled to the first motor, where the first inverter is capable of receiving direct current electrical energy from the direct current bus. The first inverter is configured to provide a first group of alternating currents with a corresponding reference phase. A second inverter is coupled to the second motor. The second inverter is capable of receiving direct current electrical energy from the direct current bus. The second inverter is configured to provide a second group of alternating currents with a phase shift with respect to the reference phase, such that the phase shift is effective to reduce the direct current ripple on the direct current bus.

BRIEF DESCRIPTION OF THE DRAWINGS

FIG. 4 shows a group of charts for direct current versus time on the direct current data bus for various degrees of phase synchronization between or among rotary electric machines connected to the direct current data bus.

DESCRIPTION OF THE PREFERRED EMBODIMENT

Ripple refers to variation in the otherwise direct current (DC) or voltage of the direct current bus. Ripple may be modeled as an alternating current signal component (e.g., a generally saw-tooth waveform) of lower magnitude that is combined with the direct current component of greater magnitude to form an aggregate signal on the direct current bus. The peak-to-peak magnitude of the ripple or the root-mean-square magnitude of the ripple may be expressed as a percentage of the direct current component or of the aggregate signal on the direct current bus.

A capacitor or capacitor bank may be associated with a ripple rating, which is the maximum current that can be applied to the capacitor at a corresponding frequency (e.g., switching frequency of an inverter) of the ripple current.

Figure 1:
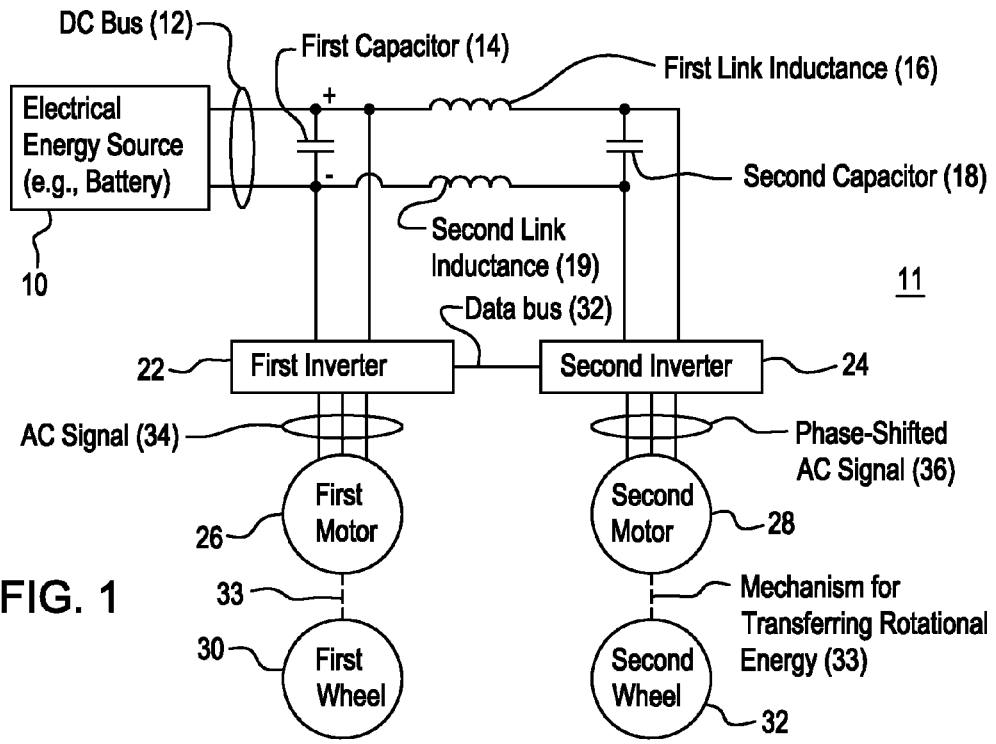
FIG. 1 is a block diagram of one embodiment of a system for controlling rotary electric machines to reduce current ripple on a direct current bus.

In accordance with one embodiment, FIG. 1 shows a system 11 that is capable of controlling the propulsion of a vehicle with reduced current ripple or ripple current on the direct current (DC) bus 12.

An electrical energy source 10 is connected to the positive and negative terminals of the direct (DC) current bus 12. For example, the electrical energy source 10 may comprise a battery, a fuel cell, the output of a generator, the rectified output of an alternator, or another electrical energy source.

The direct current (DC) bus 12 has a positive terminal and a negative terminal. A first capacitor 14 is coupled between the positive and negative terminal of the DC bus 12. The first capacitor 14 is coupled across the direct current input terminals (or corresponding input conductors) of the first inverter 22. A second capacitor 18 is coupled between the positive and negative terminal of the DC bus 12. The second capacitor 18 is coupled across the direct current input terminals (or corresponding input conductors) of the second inverter 24. In one embodiment, the first capacitor 14 and the second capacitor 18 are selected to: (1) meet a ripple rating at a maximum expected ripple current and (2) to have respective capacitances that are sufficient to reasonably smooth the ripple current to achieve a target ripple magnitude (e.g., less than approximately five percent of the aggregate DC bus signal) in conjunction with the phase offset between the alternating current output signals of the first inverter 22 and the second inverter 24, which will be later described in more detail.

The first link inductance 16 is connected between the positive terminals of the first capacitor 14 and the second capacitor 18. The second link inductance 19 is connected between the negative terminals of the first capacitor 14 and the second capacitor 18. The first capacitor 14 and the second capacitor 18 are configured to filter the direct current ripple on the DC bus 12. The first capacitor 14, the second capacitor 18, the first link inductance 16, and the second link inductance 19 may form a filtering network for reducing ripple, where the filtering network is tuned to a suitable resonant frequency range to reduce ripple current in the DC bus 12. For example, the suitable frequency range may be tuned to a frequency range (e.g., including second harmonics, other harmonics, or intermodulation products of the inverter outputs) of output signals of the first inverter 22 and the second inverter 24.

A first inverter 22 is coupled or electrically connected to the DC bus 12 for the input of DC electrical energy of the DC bus 12 to the first inverter 22. A second inverter 24 is coupled or electrically connected to the DC bus 12 for the input of DC electrical energy of the DC bus 12 to the second inverter 24. The inverter (22, 24) may comprise a motor controller, a generator controller, a rotary electric machine controller, or a device for converting direct current into one or more alternating current signals with corresponding phases. For example, the inverter may convert direct current into output signals with three respective phases. The output signals may comprise square waves, sinusoidal, pulse-width modulated, or another alternating current signal. The first inverter 22 is coupled to input terminals of the first motor 26 and the second inverter 24 is coupled to input terminals of the second motor 28.

As illustrated in FIG. 1, the first inverter 22 outputs an alternating signal 34, whereas the second inverter 24 outputs a phase-shifted alternating current signal 36 that is phase-shifted by a phase offset (e.g., approximately thirty degrees) with respect to the alternating current signal 34 to reduce current ripple on the DC bus 12. In one example, the alternating signal 34 comprises three component signals with offset phases with respect to each other, where each component signal is offset in phase by approximately 120 degrees with respect to any other component signal of the same inverter (22, 24). Accordingly, the phase shift or inter-inverter phase offset between the first inverter 22 and the second inverter 24 is actually applied individually to each of the three phase components of the phase-shifted alternating current signal 36.

In FIG. 1, the system 11 comprises a first motor 26 for applying rotational energy to a respective first wheel 30 of the vehicle via a mechanism 33 for transferring rotational energy. A second motor 28 is arranged for applying rotational energy to a respective second wheel 32 of the vehicle via the mechanism 33 for transferring rotational energy. The mechanism 33 may comprise a shaft, a linkage, a transaxle, a gearbox, or another device for transferring rotational energy, for instance. In various configurations, the first motor 26 and the second motor 28 may comprise: (1) a pair of permanent magnet machines, (2) a pair of switched reluctance machines, and (3) a combination of permanent magnet machine and a switched reluctance machine.

If the first motor 26 and the second motor 28 comprise a combination of a permanent magnet machine and switched reluctance machine, the first inverter 22 and the second inverter 24 may have output signals that are offset with respect to each other (e.g., and adjusted from approximately 30 degrees phase shift to accommodate for the different motor or machine configuration) with a phase shift (e.g., an adjusted phase shift) to minimize ripple current by increasing or by maximizing the pulse count or frequency of the ripple current on the direct current bus. By increasing or maximizing the pulse count or frequency of the ripple current on the direct current bus, the capacitor size and spatial requirements for filtering of the direct current bus 12 can be materially reduced. Similarly, if the first motor 26 and the second motor 28 have a different number of pole pairs, the first inverter 22 and the second inverter 24 may have output signals that are offset with respect to one another (e.g., and adjusted from approximately 30 degrees phase shift to accommodate for the different in pole pair numbers or configuration) with a phase shift (e.g., an adjusted phase shift) to minimize ripple current of the electrical current on the direct current bus 12.

A data bus 32 supports communications between the first inverter 22 and the second inverter 24. The data bus is capable of carrying a data message indicative of the reference phase between the first inverter 22 and the second inverter 24. In one embodiment, the data bus comprises a controller area network (CAN) data bus or another vehicle data bus.

In one embodiment, the first inverter 22 and the second inverter 24 are capable of communication with each other via a data bus 32 or other transmission line. For example, a transmitting inverter (22 or 24) may send or transmit a data message or signal to the other inverter or receiving inverter via the data bus 32 or the transmission line that indicates the phase status of the transmitting inverter or that instructs the receiving inverter to operate with a certain phase, or phase shift with respect to the transmitting inverter. In one embodiment, the first inverter 22 and the second inverter 24 may be driven by a common clock signal or another timing signal to synchronize their operation, and such clock signal or timing signal may be distributed between the inverters (22, 24) via the data bus 32 or the transmission line.

The first inverter 22 is capable of receiving direct current electrical energy from the direct current bus 12. The first inverter 22 is configured to provide a first group of alternating current signals 34 with a corresponding reference phase. A second inverter 24 is coupled to the second motor 28. The second inverter 24 is capable of receiving direct current electrical energy from the direct current bus. The second inverter 24 is configured to provide a second group of alternating current signals 36 with a phase shift with respect to the reference phase, such that the phase shift is effective to reduce the direct current ripple on the direct current bus.

In another embodiment, the first inverter 22 comprises a master inverter and the second inverter 24 comprises a slave inverter. The master inverter provides a clock signal to the slave inverter and a data message or signal that instructs the slave inverter to operate with a certain phase offset or phase shift to the master inverter. The phase offset refers to the phase that is determined with reference one of the output signals (e.g., sinusoidal output signal, pulse width modulated signal or other waveform or leading or trailing edge of a pulse) of the master inverter, for example. A second inverter 24 is coupled to the second motor 28. The second inverter 24 is capable of receiving direct current electrical energy from the direct current bus.

In one configuration, the second inverter 24 is configured to provide a second group of alternating currents with a phase shift with respect to the reference phase, such that the phase shift (e.g., approximately 30 degrees) is effective to reduce the direct current ripple on the direct current bus. The phase shift to reduce ripple current may be approximately thirty degrees, where the first motor 26 and the second motor 28 are a matched pair, have the same number of pole pairs, and are the same machine type (e.g., permanent magnet, three phase alternating current motor), for example. As used throughout this document, "approximately" shall mean plus or minus five percent of the phase shift, or other relevant value as the context requires. Although the phase shift between the alternating current signals of the first inverter 22 and the second inverter 24 may be approximately thirty degrees, in practice the phase shift may depend upon the one or more of the following factors: (1) the number of inverters coupled to the same direct current bus, (2) the load inductance or other electrical characteristics of loads (e.g., motors or machines) coupled to each inverter output, (3) whether the first inverter 22 and the second inverter 24 both control motors with the same number and configuration of pole pairs, or a different number of pole pairs, (4) whether the first inverter 22 and the second inverter 24 both control switched reluctance motors, (5) whether the first inverter 22 and the second inverter 24 both control permanent magnet motors, (6) whether the first inverter 22 is coupled to a permanent magnet machine and whether the second inverter 24 is coupled to a switched reluctance machine, or vice versa, (7) how the inverters are packaged (e.g., with inductors, capacitors, filters, matching networks, or connector configurations), (8) whether the inverter has a direct current (DC) link inductance, (9) a level of DC link inductance associated with a load motor, (10) tuning, filtering or impedance matching of the wiring harness between the inverter and its motor, and (11) operational speed range and torque requirements of the motor or machine coupled to the direct current bus.

Each output phase of a multi-phase inverter (22, 24) may be offset by approximately 360 degrees divided by the number of output phases of the multi-phase inverter. For a three phase inverter, the output phases (e.g., intra-inverter output phases) may be offset by approximately 120 degrees, whereas for a two phase inverter the output phases may be offset by approximately 180 degrees. Approximately shall mean plus or minus five percent of the value in question. The first inverter 22 may output a first group of alternating current signals that comprise three respective signals associated with three corresponding different output phases (e.g., first inverter phase A, first inverter phase B, and first inverter phase C, where the offset phases are offset by an intra-inverter phase offset). The second inverter 24 may output a second group of alternating current signals that comprise three respective signals with three corresponding different output phases (e.g., second inverter phase A, second inverter phase B, and second inverter phase C, where the offset phases are offset by an intra-inverter phase offset). Here, the phase offset or phase shift between any two inverters (i.e., the inter-inverter phase offset) can be defined as one or more of the following: (1) the absolute value of the difference between the first inverter phase A and the second inverter phase A; (2) the absolute value of the difference between the first inverter phase B and the second inverter phase B; (3) the absolute value of the difference between the first inverter phase C and the second inverter phase C. The first group of alternating current signals comprises a different pulse-width modulated signal for each input terminal of the first motor 26. The second group of alternating current signals comprises a different pulse-width modulated signal for each input terminal of the second motor 28.

Figure 2:
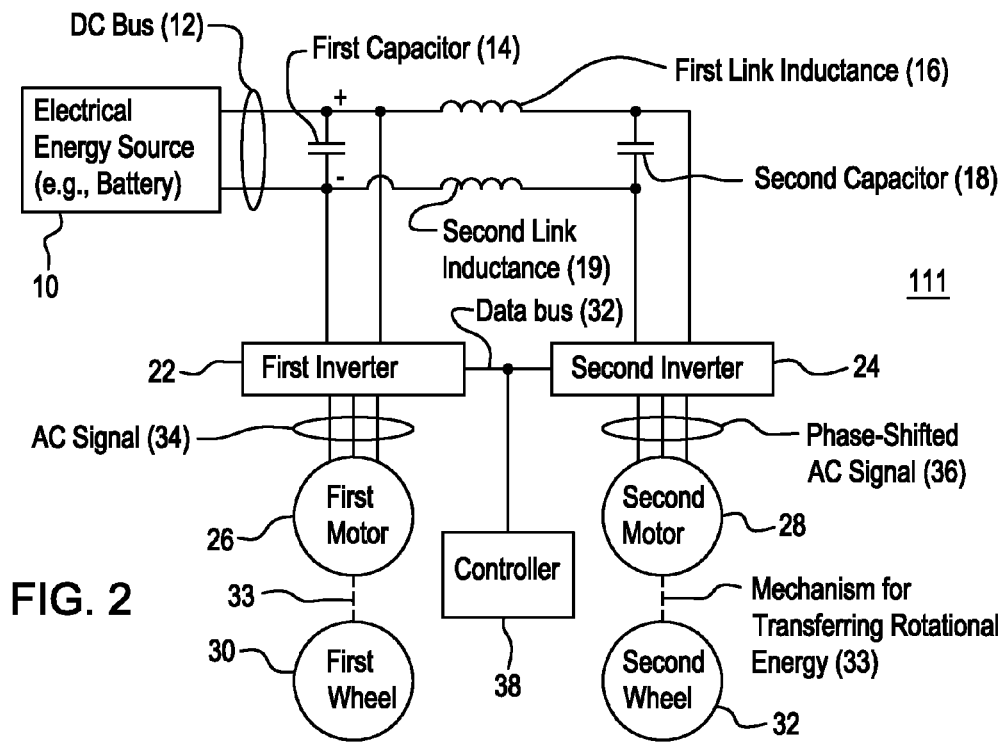
FIG. 2 is a block diagram of another embodiment of a system for controlling rotary electric machines to reduce current ripple on a direct current bus.

The system 111 of FIG. 2 is similar to the system 11 of FIG. 1, except the system 111 of FIG. 2 further comprises a controller 38 coupled to the data bus 32. Here, the controller 38 is capable of communicating with the first inverter 22 and the second inverter 24. The first inverter 22 and the second inverter 24 are capable of communication with each other via the controller 38 or directly via the data bus 32 or transmission line. For example, a transmitting inverter may send or transmit a data message or signal to the other inverter or receiving inverter via the data bus 32 or the transmission line that indicates the phase status of the transmitting inverter.

In one configuration, the controller 38 is programmed with software instructions to assign an identifier to each inverter (23, 24) and a phase shift to each inverter (e.g., that is referenced to a reference phase). The controller 38 instructs the first inverter 22 and the second inverter 24 to operate with certain assigned phases that the controller 38 determines, where the phases have a phase offset with respect to each other. In one configuration, the phase offset is determined based on the number of inverters (22, 24) and corresponding motors (26, 28) coupled to the DC bus 12.

In one embodiment, the controller 38 provides a common clock signal or another timing signal to the first inverter 22 and the second inverter 24 to synchronize their operation, and such clock signal or timing signal may be distributed between the inverters via the data bus 32 or the transmission line.

The first inverter 22 is capable of receiving direct current electrical energy from the direct current bus 12. The first inverter 22 is configured to provide a first group of alternating currents with a corresponding reference phase. A second inverter 24 is coupled to the second motor 28. The second inverter 24 is capable of receiving direct current electrical energy from the direct current bus 12. The second inverter 24 is configured to provide a second group of alternating currents with a phase shift with respect to the reference phase, such that the phase shift (e.g., approximately 30 degrees) is effective to reduce the direct current ripple on the direct current bus. Although the phase shift between the alternating current signals of the first inverter 22 and the second inverter 24 may be approximately thirty degrees, in practice the phase shift may depend upon the one or more of the following factors: (1) the number of inverters coupled to the same direct current bus 12, (2) the load inductance or other electrical characteristics of loads (e.g., motors or machines) coupled to each inverter output, (3) whether the first inverter 22 and the second inverter 24 both control motors with the same number and configuration of pole pairs, (4) whether the first inverter 22 and the second inverter 24 both control switched reluctance motors, (5) whether the first inverter 22 and the second inverter 24 both control permanent magnet motors, (6) whether the first inverter 22 is coupled to a permanent magnet machine and whether the second inverter 24 is coupled to a switched reluctance machine, or vice versa, (7) how the inverters are packaged (e.g., with inductors, capacitors, filters, matching networks, or connector configurations), (8) whether the inverter has a direct current (DC) link inductance, (9) a level of DC link inductance associated with a load motor, (10) tuning, filtering or impedance matching of the wiring harness between the inverter and its motor, and (11) operational speed range and torque requirements of the motor or machine coupled to the direct current bus.

In one embodiment, the direct current bus 12 has positive and negative terminals. A first capacitor 14 has a positive terminal and negative terminal connected in parallel between the positive and negative terminals, respectively, of the direct current bus 12. A second capacitor 18 has a positive terminal and a negative terminal connected in parallel between the positive and negative terminals, respectively, of the direct current bus 12. A first link inductance 16 is connected in series with the positive terminal of the direct current bus between the positive terminals of the first capacitor 14 and the second capacitor 18. A second link inductance 19 is connected in series with the negative terminal of the direct current bus between the negative terminals of the first capacitor 14 and the second capacitor 18, wherein the required value (e.g., in Farads) or requisite size of the capacitance of the first capacitor 14 and the second capacitor 18 can be reduced in proportion to the corresponding reduction in the direct current ripple attributable to the phase offset (of the alternating current signals) between the first inverter 22 and the second inverter 24.

In one configuration, the first link inductance 16 has an inductance within a range of approximately 50 (nano-Henries) nH to approximately 100 nH, and the second link inductance 19 has an inductance within a range of approximately 50 nH to approximately 100 nH.

Figure 3:
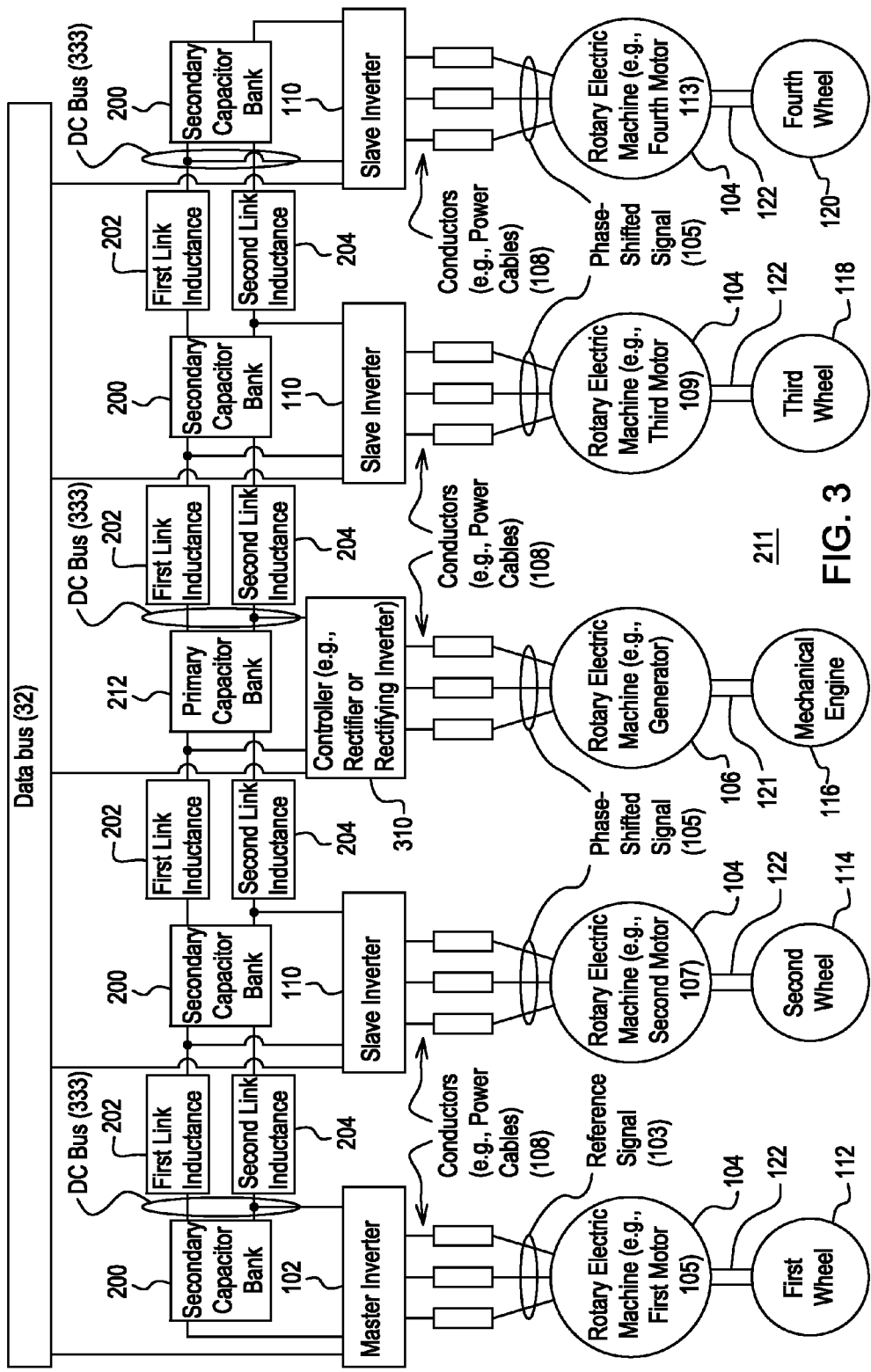
FIG. 3 is a block diagram of yet another embodiment of a system for controlling rotary electric machines to reduce current ripple on a direct current bus.

In accordance with another embodiment, FIG. 3 shows a system 211 that is capable of controlling the propulsion of a vehicle with reduced ripple current on the direct current bus 333.

A rotary electric machine 106 is connected to the positive and negative terminals of the direct (DC) current bus 333. The rotary electric machine 106 may comprise a generator or the rectified output of an alternator. An internal combustion engine 116 may provide rotational energy to the rotary electric machine 106 or the generator. The rotary electric machine 106 or the generator converts the rotational energy into electrical energy, such as a generated DC output voltage that is applied to the DC bus 333.

The DC bus 333 may be coupled to an electrical energy source 10, such as a battery, for storing the electrical energy generated by the rotary electric machine 104 or the generator.

The direct current (DC) bus 333 has a positive terminal and a negative terminal. A primary capacitor bank 212 is coupled between the positive and negative terminal of the DC bus 333. The primary capacitor bank 212 is coupled across the direct current input terminals (or corresponding input conductors) of the controller 310 (e.g., rectifier or rectifying inverter).

A series of secondary capacitor banks 200 is coupled between the positive and negative terminal of the DC bus 333. Each secondary capacitor bank 200 is coupled across the direct current input terminals (or corresponding input conductors) of an inverter (102, 110). In particular, a respective secondary capacitor bank 200 is coupled in parallel with the DC input terminals of the master inverter 102, and a respective secondary capacitor bank 200 is coupled in parallel with the DC input terminals of each corresponding slave inverter 110.

A first link inductance 202 is connected between the positive terminals of the secondary capacitor banks 200. The second link inductance 204 is connected between the negative terminals of the secondary capacitor banks 200. Near or at DC output terminals of the controller 310, the first link inductance 202 is connected between the positive terminal of the primary capacitor bank 212 and the positive terminal of a secondary capacitor bank 200. Similarly, the second link inductance 204 is connected between the negative terminal of the primary capacitor bank 212 and the negative terminal of a secondary capacitor bank 200.

The primary capacitor bank 212 is configured to filter the direct current ripple of the DC bus 333 for DC output generated by the controller 310 and rotary electric machine 104 (e.g., generator). The secondary capacitor banks 200 are configured to filter the direct current ripple on the DC bus 333 that is consumed by the rotary electric machines 104 (e.g., motors). The primary capacitor bank 212, the secondary capacitor bank 200, the first link inductance 202, and the second link inductance 204 may form a filtering network for reducing ripple, where the filtering network is tuned to a suitable resonant frequency range to reduce ripple current in the DC bus 333. The suitable resonant frequency range may commensurate with a switching frequency (or harmonics) of one or more of the inverters (102, 110).

In one embodiment, each primary capacitor bank 212 may comprise an array or group of electrolytic capacitors. Similarly, each secondary capacitor bank 200 may comprise an array or group of electrolytic capacitors. Each electrolytic capacitor may be composed of film, electrolytic materials, dielectric material, a sealed housing, metallic plates, or electrolytic capacitors.

A master inverter 102 (or primary inverter) is coupled or electrically connected to the DC bus 333 for the input of DC electrical energy of the DC bus to the master inverter 102. A group of slave inverters 110 (or secondary inverters) is coupled or electrically connected to the DC bus 333 for the input of DC electrical energy of the DC bus 333 to the slave inverters 110 (secondary inverters). Each of the master inverters 102 (or primary inverters) may comprise a motor controller, a generator controller, a rotary electric machine controller, or a device for converting direct current into one or more alternating current signals with corresponding phases. Similarly, each of the slave inverters 110 (or secondary inverters) may comprise a motor controller, a generator controller, a rotary electric machine controller, or a device for converting direct current into one or more alternating current signals with corresponding phases. For example, the inverter may convert direct current into output signals with three respective phases. The output signals may comprise square waves, sinusoidal, pulse width modulated, or another alternating current signal.

In one embodiment, the master inverter 102 (or primary inverter) may establish a reference phase for its output signal, which is tracked by the slave inverters 110 (or secondary inverters). For example, the master inverter 102 may transmit a reference phase signal 103 to each of the slave inverters 110 via the data bus 32, along with a timing signal or clock signal, such that each slave inverter 110 can instruct its rotary electric machine 104 to operate with a different phase offset (or with phase shifted signal 105) with respect to the master inverter 102. In another example, the master inverter 102 may assign an operational phase (or phase offset) to each slave inverter 110, where each slave inverter 110 has a corresponding unique inverter identifier.

Each inverter (102, 110) is coupled to terminals of a rotary electric machine 104 via conductors, such as power cables 108. For example, the master inverter 102 is coupled to the input terminals of rotary electric machine 104 or the motor. The slave inverter 110 is coupled to the input terminals of the rotary electric machine 104 or the motor. The controller 310 is coupled to the output terminals of the rotary electric machine 106.

In FIG. 3, the system 211 comprises a rotary electric machine 104 (e.g., first motor 105) for applying rotational energy to a respective first wheel 112 (e.g., right rear wheel) of the vehicle via a mechanism 122 for transferring rotational energy. Another rotary electric machine 104 (e.g., a second motor 107) is adapted to apply rotational energy to a respective second wheel 114 (e.g., right front wheel) of the vehicle via a mechanism 122 for transferring rotational energy. Another rotary electric machine 104 (e.g., a third motor 109) is adapted to apply rotational energy to a respective third wheel 118 (e.g., left front wheel) of the vehicle via a mechanism 122 for transferring rotational energy. Another rotary electric machine 104 (e.g., a fourth motor 113) is adapted to apply rotational energy to a respective second wheel 114 (e.g., left rear wheel) of the vehicle via a mechanism 122 for transferring rotational energy. The mechanism 122 for transferring rotational energy may comprise a shaft, a wheel hub, a linkage, a drive train, a transaxle, a universal joint, a constant velocity joint, a solid axle, a transmission, a chain or belt drive system, or another mechanical structure for transferring rotational energy from the rotary electric machine 104 to a wheel, a ground-engaging member or tracks.

The master inverter 102 and each slave inverter 110 are capable of communication with each other via a data bus 32 or other transmission line. For example, a master inverter 102 may send or transmit a data message or signal to the other inverters or slave inverters 110 (and the controller 310) via the data bus 32 or the transmission line that indicates the phase status of the master inverter 102 or that instructs the slave inverters 110 and controller 310 (e.g., rectifier) to operate with a certain respective phases, coordinated offsets, or phase shifts (e.g., each offset by approximately twelve to approximately 36 degrees of phase shift). In one embodiment, the master inverter 102 and the slave inverters 110 (and the controller 310) may be driven by a common clock signal or another timing signal to synchronize their operation, and such clock signal or timing signal may be distributed between the inverters via the data bus 32 or the transmission line.

The master inverter 102 is capable of receiving direct current electrical energy from the direct current bus 333. The master inverter 102 is configured to provide a first group of alternating currents with a corresponding reference phase. The slave inverters 110 are coupled to respective rotary electric machines 104 (e.g., electric motors). Each slave inverter 110 is capable of receiving direct current electrical energy from the direct current bus 333. Each slave inverter 110 is configured to provide a second group of alternating currents with a phase shift with respect to the reference phase, such that the phase shift is effective to reduce the direct current ripple on the direct current bus 333.

In another embodiment, the master inverter 102 provides a clock signal to the slave inverter 110 and a data message or signal that instructs the slave inverter 110 to operate with a certain phase offset to the master inverter 102. The phase offset refers to the phase that is determined with reference one of the output signals (e.g., sinusoidal output signal, pulse width modulated signal or other waveform) of the master inverter 102, for example.

In one embodiment, a system 211 for controlling the propulsion of a vehicle, the system 211 comprises a direct current bus 333 and plurality of respective rotary electric machines 104 for applying rotational energy to corresponding wheels of the vehicle. The rotary electric machines 104 may comprise electric motors or a group of electric motors and a generator (e.g., alternator). A plurality of inverters comprise a master inverter 102 and slave inverters 110. Each of the inverters 333 are coupled to a respective one of the rotary electric machines 104. Each inverter is arranged to receive direct current electrical energy from the direct current bus. The master inverter 102 is adapted to provide a reference group of alternating current signals with a corresponding reference phase. Each of the slave inverters 110 is adapted provide a respective group of alternating current signals with different offset phase shift with respect to the reference phase, such that the different offset phase shift is effective to reduce the direct current ripple on the direct current bus 333.

A data bus 32 supports communications between the master inverter 102 and the slave inverters 110. The data bus 32 is capable of carrying a data message indicative of the reference phase from the master inverter 102 to the slave inverters 110. In one configuration, the data bus 32 comprises a controller area network (CAN) data bus or another vehicle data bus 32. The master inverter 102 adapted to assign an identifier to each inverter and a phase shift to each inverter that is referenced to the reference phase.

The direct current bus 333 has positive and negative terminals. A primary capacitor bank 212 has a positive terminal and negative terminal connected in parallel between the positive and negative terminals, respectively, of the direct current bus. A secondary capacitor bank 200 has a positive terminal and a negative terminal connected in parallel between the positive and negative terminals, respectively, of the direct current bus. A first link inductance 202 connected in series with the positive terminal of the direct current bus between the positive terminals of the primary capacitor bank 212 and the secondary capacitor bank 200. A second link inductance 204 connected in series with the negative terminal of the direct current bus between the negative terminals of the primary capacitor bank 212 and the secondary capacitor bank 200, wherein the required value (e.g., in Farads) or requisite size of the capacitance of the primary capacitor bank 212 and the secondary capacitor bank 200 can be reduced in proportion to the corresponding reduction in the direct current ripple attributable to the phase offset between the master inverter 102 and each corresponding slave inverter 110 and attributable to the phase offset between the master inverter 102 and the controller 310 (e.g., rectifier).

In one embodiment, the first link inductance 202 has an inductance within a range of approximately 50 nanoHenries (nH) to approximately 100 nH, and the second link inductance 204 has an inductance within a range of approximately 50 nH to approximately 100 nH. In another embodiment, the phase shift between the master inverter 102 and each slave inverter 110 is determined in accordance with the following equation:

$P=360/(6*N)$, where P is the phase shift between the master inverter 102 and any slave inverter 110, and N is the total number of inverters including the master inverter 102 and the slave inverters 110.

In one configuration, the respective group of different alternating current signals (103, 105) comprises three respective signals associated with three corresponding offset phases. The respective group of alternating current signals comprises a different pulse width modulated signal for each input terminal of the rotary electric machines 104.

In an alternate embodiment, all the distributed capacitors (e.g., electrolytic/film capacitors) of any embodiment disclosed in this document could be combined or lumped together into a lumped capacitor bank, where the inverters are connected with the lumped capacitor bank via a laminated bus bar (e.g., or another capacitance-augmented transmission line) to offer minimum possible inductance or reduced inductance over other bus bar or conductor configurations.

FIG. 4 shows a group of charts or graphs for direct current versus time on the direct current bus for various degrees of phase synchronization between or among rotary electric machines (104, 106, 26 or 28) connected to the direct current bus (12 or 333). In the upper left corner, a first chart 401 represents DC bus current for two inverters (e.g., 22, 24) coupled to the same direct current bus (e.g., 12) with no phase shift between the inverters. The vertical axis 400 represents magnitude of the signal, whereas the horizontal axis 402 represents the time.

In the upper right corner, a second chart 407 represents DC bus current for two inverters (22 or 24) coupled to the same direct current bus (12 or 333) with an approximately thirty degrees phase shift between the two inverters. For example, if a first inverter 22 has three output phases, called a first phase (Phase A), a second phase (Phase B) and a third phase (Phase C), where each phase of the first inverter 22 is offset approximately 120 degrees to any other phase of the first inverter 22; the second inverter 24 has a first phase (Phase A) that is offset approximately thirty degrees to the first phase (Phase A) of the first inverter 22; the second inverter 24 has a second phase (Phase B) that is offset approximately thirty degrees to the second phase (Phase B) of the first inverter 22; and the second inverter 24 has a third phase (Phase C) that is offset approximately thirty degrees from the third phase (Phase C). Accordingly, chart 407 represents the possible performance of the system of FIG. 1 or FIG. 2, where the phase offset is approximately 30 degrees between the first inverter and the second inverter. The reduction in the ripple current of the DC current in chart 407 with respect to chart 401 is readily apparent. Like reference numbers in chart 401 and chart 407 of FIG. 4 indicate like elements or features.

On the left bottom of FIG. 4, the chart 403 is similar to the chart 401, except it further includes the outputted alternating current phases of the first inverter 22. For the first inverter 22, the first phase 408, the second phase 404 and the third phase 406 are separated by approximately 120 degrees. The current ripple in the DC bus current is impacted by each of the three phases in the region of the maximum deviation or current outputted by the inverter (22 or 24) to the rotary machine or motor. In chart 403, the first inverter 22 and the second inverter 24 are operating with no phase shift with respect to each other and are coupled to the same direct current bus 12.

On the right bottom of FIG. 4, the chart 409 is similar to the chart 407, except it further includes the outputted alternating current phases of the first inverter 42. For the first inverter 42, the first phase 408, the second phase 404 and the third phase 406 are separated by approximately 120 degrees. The current ripple in the DC bus 12 current is impacted by each of the three phases in the region of the maximum deviation or current outputted by the inverter (22 or 24) to the rotary machine or motor (26 or 28). In chart 409, the first inverter 22 and the second inverter 24 are operating with an approximately thirty degrees phase shift with respect to each other and are coupled to the same direct current bus 12. Accordingly, the current ripple on the DC bus is reduced in a similar way that shown in chart 407.

The system disclosed in this document is well-suited for reducing the size, weight or maximum capacity of one or more capacitors on the direct current bus that feeds multiple inverters of a vehicle. The size, weight or capacity of the capacitors may be decreased from a worst-case size or worst-case capacity that is otherwise required to support worst-case operating conditions of one or more motors or machines of the vehicle, such as low speed operation, stall current in the motor, and minimum switching frequency of the motor. Instead, the system disclosed in this document facilitates control of a vehicle with multiple inverters and corresponding motors by synchronizing the alternating current phases (e.g., with predetermined phase offsets) of the inverters to reduce, limit, or manage ripple current. Further, the system disclosed in this document supports using both permanent magnet and switched reluctance machines or motors on the same vehicle, while minimizing the capacitor bank size and weight through synchronization of the phases of the alternating current signals that feed the switched reluctance (SR) machine (e.g., SR motor) and permanent magnet machine (SM). The system disclosed in this document supports using machines with different pole pair numbers or configurations for the same vehicle, while minimizing the capacitor bank size and weight through synchronization of the phases of the alternating current signals that feed machines with different pole pair configurations. The foregoing invention is useful for reducing the cost (and associated weight or spatial requirements) of capacitors of greater capacity to smooth ripple current on the direct current bus that would otherwise be used in hybrid and electric vehicles, for example.

Having described the preferred embodiment, it will become apparent that various modifications can be made without departing from the scope of the invention as defined in the accompanying claims.

The following is claimed:

1. A system for controlling the propulsion of a vehicle, the system comprising:
a direct current bus for receiving direct current electrical energy from an electrical energy source;
a first motor for applying rotational energy to a respective first wheel of the vehicle;
a second motor for applying rotational energy to a respective second wheel of the vehicle;
a first inverter coupled to the first motor, the first inverter receiving direct current electrical energy from the direct current bus, the first inverter providing a first group of alternating currents with at least one corresponding reference phase; and
a second inverter coupled to the second motor, the second inverter receiving direct current electrical energy from the direct current bus, the second inverter providing a second group of alternating currents with a phase shift comprising a phase offset of approximately thirty degrees with respect to the at least one reference phase, such that the phase shift is effective to reduce the direct current ripple on the direct current bus, where the first motor and the second motor generally have a same number of pole pairs.

2. The system according to claim 1 further comprising:
a data bus that supports communications between the first inverter and the second inverter, the data bus capable of carrying a data message indicative of the reference phase from the first inverter to the second inverter.

3. The system according to claim 2 wherein the data bus comprises a controller area network (CAN) data bus or another vehicle data bus.

4. The system according to claim 2 further comprising:
a controller coupled to the data bus, the controller assigning an identifier to each inverter and a phase shift to each inverter that is referenced to the at least one reference phase.

5. The system according to claim 4 wherein the first link inductance has an inductance within a range of approximately 50 (nano-Henries) nH to approximately 100 nH, and wherein the second link inductance has an inductance within a range of approximately 50 nH to approximately 100 nH.

6. The system according to claim 1 further comprising:
the direct current bus having positive and negative terminals;
a first capacitor having a positive terminal and negative terminal connected in parallel between the positive and negative terminals, respectively, of the direct current bus;
a second capacitor having a positive terminal and a negative terminal connected in parallel between the positive and negative terminals, respectively, of the direct current bus;
a first link inductance connected in series with the positive terminal of the direct current bus between the positive terminals of the first capacitor and the second capacitor; and
a second link inductance connected in series with the negative terminal of the direct current bus between the negative terminals of the first capacitor and the second capacitor, wherein the required value or requisite size of the capacitance of the first capacitor and the second capacitor can be reduced in proportion to the corresponding reduction in the direct current ripple.

7. The system according to claim 1 wherein the phase shift is adjusted from approximately thirty degrees between the at least one reference phase of the first inverter and a phase of the second inverter if the number of pole pairs are different.

8. The system according to claim 1 wherein:
the first group of alternating current signals comprises three respective signals associated with three corresponding offset phases, and wherein
the second group of alternating current signals comprises three respective signals with three corresponding offset phases, and wherein the phase shift is between corresponding pairs of the first group and second group of alternating current signals.

9. The system according to claim 1 wherein the first group of alternating current signals comprises a different pulse width modulated signal for each input terminal of the first electric motor, and wherein the second group of alternating current signals comprises a different pulse width modulated signal for each input terminal of the second motor.

10. The system according to claim 1 wherein the first and second inverters operate at a switching frequency.

11. The system according to claim 1 wherein the first and second alternating current signals comprise sinusoidal output signals.

12. The system according to claim 1 wherein the first motor and the second motor collectively comprise a pair of permanent magnet motors or a pair of a switched reluctance motors.

13. A system for controlling the propulsion of a vehicle, the system comprising:
a direct current bus for receiving direct current electrical energy from an electrical energy source;
a plurality of respective rotary electric machines for applying rotational energy to corresponding wheels of the vehicle;
a plurality of inverters comprising a master inverter and slave inverters, each of the inverters coupled to a respective one of the rotary electric machines, each inverter arranged to receive direct current electrical energy from the direct current bus;
the master inverter adapted to providing a reference group of alternating current signals with at least one corresponding reference phase;
each of the slave inverters adapted provide a respective group of alternating current signals with different offset phases and a phase shift with respect to the at least one reference phase, such that the different offset phases and phase shift is effective to reduce the direct current ripple on the direct current bus, wherein the phase shift between the master inverter and each slave inverter is determined in accordance with the following equation:
P=360/(6*N), where P is the phase shift between the master inverter and any slave inverter, and N is the total number of inverters including the master inverter and the slave inverters.

14. The system according to claim 13 further comprising:
a data bus that supports communications between the master inverter and the slave inverters, the data bus capable of carrying a data message indicative of the at least one reference phase from the master inverter to the slave inverters.

15. The system according to claim 14 wherein the data bus comprises a controller area network (CAN) data bus or another vehicle data bus.

16. The system according to claim 14 further comprising:
the master inverter adapted to assign an identifier to each inverter and a phase shift to each inverter that is referenced to the reference phase.

17. The system according to claim 13 further comprising:
the direct current bus having positive and negative terminals;
a first capacitor having a positive terminal and negative terminal connected in parallel between the positive and negative terminals, respectively, of the direct current bus;
a second capacitor having a positive terminal and a negative terminal connected in parallel between the positive and negative terminals, respectively, of the direct current bus;
a first link inductance connected in series with the positive terminal of the direct current bus between the positive terminals of the first capacitor and the second capacitor; and
a second link inductance connected in series with the negative terminal of the direct current bus between the negative terminals of the first capacitor and the second capacitor, wherein the required value or requisite size of the capacitance of the first capacitor and the second capacitor can be reduced in proportion to the corresponding reduction in the direct current ripple.

18. The system according to claim 17 wherein the first link inductance has an inductance within a range of approximately 50 nanoHenries (nH) to approximately 100 nH, and wherein the second link inductance has an inductance within a range of approximately 50 nH to approximately 100 nH.

19. The system according to claim 13 wherein:
the respective group of different alternating current signals comprises three respective signals associated with three corresponding offset phases.

20. The system according to claim 13 wherein the respective group of alternating current signals comprises a different pulse width modulated signal for each input terminal of the rotary electric machines.

21. The system according to claim 13 wherein the rotary electric machines comprise electric motors.

22. The system according to claim 13 wherein the rotary electric machine comprises a generator and one or more motors.

* * * * *